J. HUNSBERGER,

Assignor to R. Hoffheins.

HORSE-RAKE.

No. 7,746. Reissued June 12, 1877.

WITNESSES:

C. Clarence Poole

D. P. Corl

INVENTOR:

Jonathan Hunsberger

By his Atty

R. D. Smith.

N. PETERS, PHOTO-LITHOGRAPHER, WASHINGTON, D. C.

UNITED STATES PATENT OFFICE.

JONATHAN HUNSBERGER, OF WORCESTER TOWNSHIP, MONTGOMERY COUNTY, ASSIGNOR TO REUBEN HOFFHEINS, OF YORK, PA.

IMPROVEMENT IN HORSE-RAKES.

Specification forming part of Letters Patent No. 78,969, dated June 16, 1868; reissue No. 7,746, dated June 12, 1877; application filed May 8, 1877.

DIVISION B.

*To all whom it may concern:*

Be it known that I, JONATHAN HUNSBERGER, of Worcester township, in the county of Montgomery and State of Pennsylvania, have invented a new and useful Improvement in Horse Hay-Rakes; and I do hereby declare that the following is a full, clear, and exact description thereof, which will enable others skilled in the art to make and use the same, reference being had to the accompanying drawings, forming part of this specification.

Figure 1:
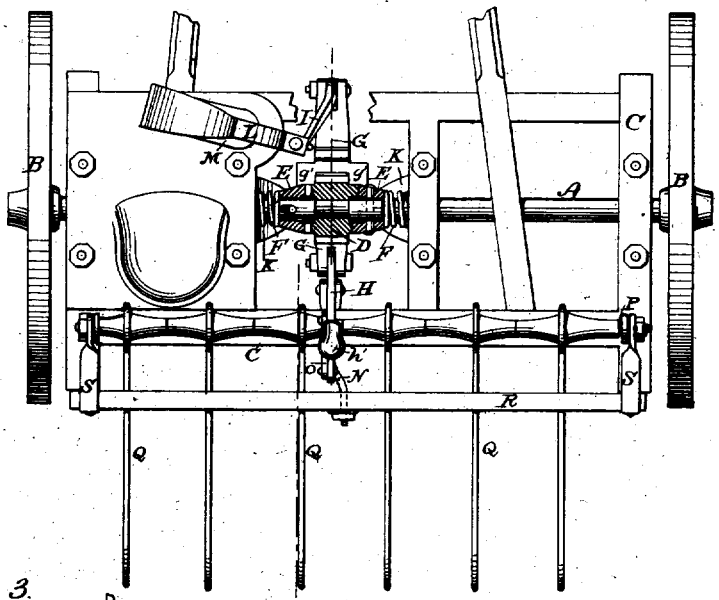
Figure 3:
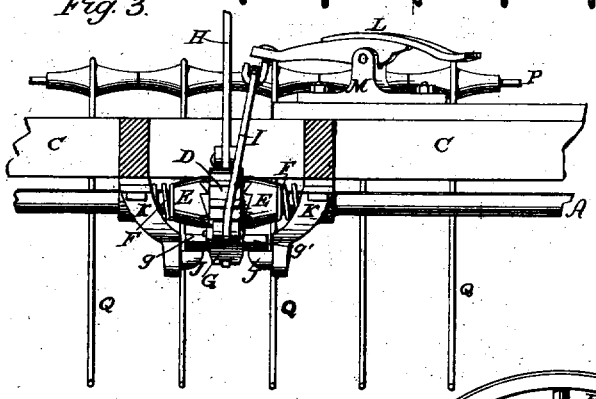
Figure 2:
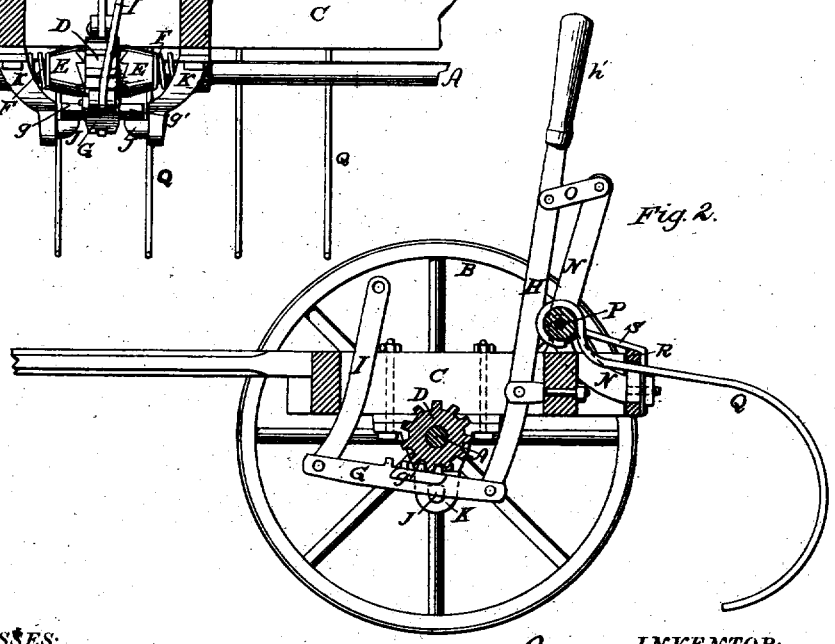

Figure 1 is a top view of a horse hay-rake to which my improvement has been attached. Fig. 2 is a cross-section of the same, taken through the line *x x*, Fig. 1. Fig. 3 is a detail view of the same.

Similar letters of reference indicate corresponding parts.

My invention has for its object to improve the construction of wire-toothed horse hay-rakes, so that the driver, by a simple movement of foot-lever, can cause the rake to rise and discharge the collected hay; and it consists in the foot-lever and sliding toothed rack, in combination with the cog-wheel and spring-clutches, attached to the inner ends of the parts of the axle, and with the levers, by which the sliding rack is connected to the rake-head, the whole being constructed and arranged as hereinafter more fully described.

A is the axle of the rake, to which the wheels B are rigidly attached, so as to carry the parts of the said axle with them in their revolution. The axle A revolves in bearings attached to the frame C. The inner ends of the parts of the axle A enter and work in the hole through the cog-wheel D. E are two sliding clutches, placed upon the parts of the axle A in such positions as to take hold of the clutches formed upon the sides of the cog-wheel D, against which they are held by the action of the springs F coiled around and attached to the said parts of axle.

By this construction the wheels B can act independently of each other, the cog-wheel D being carried forward by the revolution of whichever wheel may be advancing, the clutch of the wheel that may be stationary or revolving backward sliding over the cog-wheel D so that the rake may be easily turned in either direction. G is a toothed rack-bar, the rear end of which is pivoted to the lower end of the lever H, and its forward end to the lower end of the connecting-bar I, as shown in Fig. 2. Upon the side edges of the rack-bar G are formed flanges *g'*, which, when the rack G is moving back in contact with the cog-wheel D, slide upon the blocks J, attached to the inner sides of the arms K, which are attached to the frame C, as shown in Fig. 3. The upper end of the connecting-rod I is pivoted to the end of the foot-lever L, which is pivoted to the standard M attached to the frame C, and the free end of which extends out into such a position that it may be easily reached and operated by the driver with his foot, to raise the rack G into contact with the cog-wheel D. The lever H is pivoted to the frame C, and its upper part is connected with the upper end of the bent lever N by the connecting-bar O, as shown in Fig. 2. The bent lever N is pivoted at its angle to the shaft P, to which the rake-teeth Q are pivoted, and its lower end is attached to the bar R through slots, in which the rake-teeth Q pass, and which is connected and pivoted to the shaft P by the arms S, so that by raising the bar R the rake-teeth Q will be raised to drop the collected hay, while at the same time each tooth may rise independently, should it encounter an obstruction.

The upper end of the lever H may be extended, and may have a handle, *h'*, formed upon or attached to it, so that the driver may raise the rake-teeth by hand, and instantaneously, should occasion require it to be so raised.

Having described my invention, what I claim as new is—

1. An axle divided in the center, so that the parts may turn independently, combined with a toothed rack and cog-wheel connected with the parts of said axle, substantially as herein shown and described, for the purpose operating the rake-teeth to discharge the collected hay.

2. The combination of the foot-lever L, toothed rack G, cog-wheel D, sliding spring-clutches E, and levers H and N, with each other, and with the axle A, frame C, and pivoted bar R, substantially as herein shown and described, and for the purpose set forth.

3. The combination of the arms K and blocks J with the flanges $g'$, formed upon the side edges of the toothed rack G, substantially as herein shown and described, and for the purpose set forth.

JONATHAN HUNSBERGER.

Witnesses:

WM. F. HALLMAN,

ABRAM S. GELLER.